US010693582B2

(12) United States Patent
Rosasco et al.

(10) Patent No.: US 10,693,582 B2
(45) Date of Patent: Jun. 23, 2020

(54) LOCALIZATION OF REFERENCE SYMBOLS IN COMMUNICATIONS SYSTEMS

(71) Applicant: The Johns Hopkins University, Baltimore, MD (US)

(72) Inventors: Richard J. Rosasco, Millersville, MD (US); Brian W. Stevens, Elkridge, MD (US); Aaron T. Thomas, Middletown, MD (US)

(73) Assignee: The Johns Hopkins University, Baltimore, MD (US)

( * ) Notice: Subject to any disclaimer, the term of this patent is extended or adjusted under 35 U.S.C. 154(b) by 0 days.

(21) Appl. No.: 16/233,148

(22) Filed: Dec. 27, 2018

(65) Prior Publication Data

US 2019/0268084 A1    Aug. 29, 2019

Related U.S. Application Data

(60) Provisional application No. 62/636,202, filed on Feb. 28, 2018.

(51) Int. Cl.
*H04W 56/00* (2009.01)
*H04J 11/00* (2006.01)
*H04W 76/11* (2018.01)
*H04L 27/26* (2006.01)
(Continued)

(52) U.S. Cl.
CPC ....... *H04J 11/0069* (2013.01); *H04J 11/0079* (2013.01); *H04L 5/0048* (2013.01);
(Continued)

(58) Field of Classification Search
CPC . H04J 11/0069; H04J 11/0079; H04L 5/0094; H04L 5/0048; H04L 27/2607;
(Continued)

(56) References Cited

U.S. PATENT DOCUMENTS 8,705,468 B2    4/2014  Montojo et al.
8,781,034 B2*   7/2014  Pu .................. H04L 27/2649
                                                    375/260
(Continued)

FOREIGN PATENT DOCUMENTS

WO    2018/144337    8/2018

OTHER PUBLICATIONS

Aidin Reyhanimasoleh, "Resource Allocation in Uplink Long Term Evolution," Master's Thesis for The School of Graduate and Post-doctoral Studies (The University of Western Ontario, London, Ontario, Canada), Electronic Thesis and Dissertation Repository Paper 1627, Sep. 2013, pp. ii-93.

*Primary Examiner* — Un C Cho
*Assistant Examiner* — Lalita W Pace
(74) *Attorney, Agent, or Firm* — Noah J. Hayward

(57) ABSTRACT

An example method for determining a physical cell identifier is provided. The example method may include receiving a first and second signal captures from wireless, cellular communication signals transmitted by a base station. The first signal capture being a portion of a first radio frame and the second signal capture being a portion of a second, subsequent radio frame. The method may further include aligning the first and second signal captures to determine a location of a start of a first symbol in each and decoding data within signal captures to generate a first capture grid and a second capture grid. The method may further include combining the capture grids into a resultant grid and determining a subset of possible physical cell identifiers based on a position of a selected reference symbol within the resultant grid to assist with determining a current cell identifier.

20 Claims, 10 Drawing Sheets

(51) Int. Cl.
*H04L 5/00* (2006.01)
*H04W 72/04* (2009.01)

(52) U.S. Cl.
CPC ........ *H04L 5/0094* (2013.01); *H04L 27/2607* (2013.01); *H04W 56/001* (2013.01); *H04W 72/0446* (2013.01); *H04W 76/11* (2018.02); *H04L 5/0078* (2013.01)

(58) Field of Classification Search
CPC ............... H04L 5/0078; H04L 27/2611; H04L 27/2662; H04L 7/204; H04L 7/2125; H04L 7/2662; H04L 7/2675; H04L 2/2678; H04L 2/2681; H04W 72/0446; H04W 56/001; H04W 76/11; H04W 48/10
See application file for complete search history.

(56) References Cited

U.S. PATENT DOCUMENTS

| | | | |
|---|---|---|---|
| 8,982,814 B2 | 3/2015 | Frenne et al. | |
| 8,989,208 B2 | 3/2015 | Chen et al. | |
| 9,036,566 B2 | 5/2015 | Mochizuki et al. | |
| 9,094,906 B2 | 7/2015 | Guey et al. | |
| 9,276,722 B2 | 3/2016 | Gaal et al. | |
| 9,456,441 B2 | 9/2016 | Suzuki et al. | |
| 9,560,655 B2 | 1/2017 | von Elbwart et al. | |
| 9,681,482 B2 | 6/2017 | Yang et al. | |
| 10,122,566 B2 | 11/2018 | Paredes Riano et al. | |
| 2009/0011767 A1* | 1/2009 | Malladi | H04B 1/713 455/450 |
| 2010/0323684 A1* | 12/2010 | Cai | H04L 5/005 455/422.1 |
| 2014/0161056 A1* | 6/2014 | Moulsley | H04W 72/042 370/329 |
| 2015/0038160 A1* | 2/2015 | Ngai | H04W 64/003 455/456.1 |
| 2016/0149681 A1* | 5/2016 | Vajapeyam | H04L 5/0048 370/252 |
| 2017/0237463 A1* | 8/2017 | Zheng | H04W 56/00 370/328 |
| 2017/0257243 A1* | 9/2017 | Sahlin | H04L 5/0048 |
| 2018/0132243 A1 | 5/2018 | Yang et al. | |
| 2018/0270770 A1* | 9/2018 | Shim | H04W 56/001 |
| 2018/0295590 A1* | 10/2018 | Abedini | H04W 56/001 |

* cited by examiner

LOCALIZATION OF REFERENCE SYMBOLS IN COMMUNICATIONS SYSTEMS

CROSS-REFERENCE TO RELATED APPLICATIONS

This application claims priority to and the benefit of prior-filed, co-pending U.S. Provisional Application No. 62/636,202 filed on Feb. 28, 2018, the entire contents of which are hereby incorporated herein by reference.

STATEMENT OF GOVERNMENTAL INTEREST

This invention was made with Government support under contract number N00024-13-D-6400 awarded by the Naval Sea Systems Command (NAVSEA). The Government has certain rights in the invention.

TECHNICAL FIELD

Exemplary embodiments of the present disclosure generally relate to wireless, cellular communications, and more specifically relate to determining relative timing or systems and cell identifiers associated with wireless cellular communications.

BACKGROUND

Long term evolution (LTE) communications systems are constructed on a framework of geographic cells that are each associated with a base station or cellular tower. Each cell is identified on the physical layer by a physical cell identifier (PCI) or cell ID, which can be one of finite set of values (e.g., 504). The cells are geographically arranged in a manner such that a single mobile device, also referred to as a user equipment (UE), should not interact with two cells with the same PCI at the same time. The PCI can be used by the mobile communications device during cell selection procedures to determine appropriate settings for signal synchronization and random access with the corresponding base station. As such, the identification of the PCI for a current cell of a mobile communications device can be an essential operation for maintaining continued cellular communications, particularly as a mobile communications device undertakes handoffs between cells.

Typically, the PCI for a current cell of the mobile communications device is determined based on communications received from an LTE base station. Under the LTE standards, the base station transmits information organized in frames across sub-carriers and time, where each frame includes information that the mobile communications device can use to support communications with the base station or prevent (or block communications with the base station). In this regard, a frame may include information in the form of a primary synchronization signal (PSS) and a secondary synchronization signal (SSS). Information encoded into the PSS and the SSS can be extracted and interpreted to determine the specific PCI for the mobile communications device's current cell.

However, in some circumstances, the mobile communications device may not receive the entire frame and may only receive a portion of the frame, and in some instances, this may happen repeatedly such that the mobile communications device doesn't receive the PSS and the SSS. Under these circumstances, the mobile communications device may undertake a blind search to identify the PCI. However, using conventional blind search approaches, the mobile communications device may need to consider, for example, 70,560 permutations before discovering the current PCI. Due to the number of permutations, the process of identifying the PCI using such approaches can be extremely time consuming and problematic when attempting to maintain continued, reliable communications between cells.

BRIEF SUMMARY OF SOME EXAMPLES

According to some example embodiments, a method for determining a physical cell identifier is provided. The example method may comprise receiving a first signal capture from a first wireless, cellular communication signal transmitted by a base station. In this regard, the first signal capture may be a portion of a first radio frame. The example method may further comprise aligning the first signal capture to determine a location of a start of a first symbol in the first signal capture, and decoding data within the first signal capture to generate a first capture grid based on the location of the start of the first symbol in the first signal capture. The example method may further comprise receiving a second signal capture from a second wireless, cellular communication signal transmitted by the base station. The second signal capture may be one or more radio frame durations after the first signal capture, and the second signal capture may be a portion of a second radio frame. The example method may further comprise aligning the second signal capture to determine a location of a start of a second symbol in the second signal capture, and decoding data within the second signal capture to generate a second capture grid based on the location of the start of the second symbol in the second signal capture. The example method may further comprise combining the first capture grid with the second capture grid to generate a resultant grid. The resultant grid may indicate positions of reference symbols that are commonly located within both the first capture grid and the second capture grid. The example method may further comprise determining a subset of possible physical cell identifiers based on a position of a selected reference symbol within the resultant grid, and performing a search of the subset of possible physical cell identifiers to identify a current cell identifier corresponding to the base station for a mobile communications device.

Additionally, according to some example embodiments, a mobile communications device configured to determine a physical cell identifier is provided. The mobile communications device may comprise one or more antennas and processing circuitry. The processing circuitry may be operably coupled to the one or more antennas to support wireless, cellular communications with a base station. The processing circuitry may be configured to receive a first signal capture from a first wireless, cellular communication signal transmitted by the base station via the one or more antennas. In this regard, the first signal capture may be a portion of a first radio frame. The processing circuitry may be further configured to align the first signal capture to determine a location of a start of a first symbol in the first signal capture and decode data within the first signal capture to generate a first capture grid based on the location of the start of the first symbol in the first signal capture. The processing circuitry may be further configured to receive a second signal capture from a second wireless, cellular communication signal transmitted by the base station via the one or more antennas. In this regard, the second signal capture may be one or more radio frame durations after the first signal capture. The second signal capture may be a portion of a second radio frame. The processing circuitry may be further configured to align the second signal capture to determine a location of a start of a first symbol in the second signal capture, and decode data within the second signal capture to generate a second capture grid based on the location of the start of the second symbol in the second signal capture. The processing circuitry may be further configured to combine the first capture grid with the second capture grid to generate a resultant grid. The resultant grid may indicate positions of reference symbols that are commonly located within both the first capture grid and the second capture grid. The processing circuitry may be further configured to determine a subset of possible physical cell identifiers based on a position of a selected reference symbol within the resultant grid, and perform a search of the subset of possible physical cell identifiers to identify a current cell identifier corresponding to the base station for the mobile communications device.

Additionally, according to some example embodiments, a cellular communications system is provided. The cellular communication system may comprise a base station and a mobile communications device. The base station may comprise at least one base station antenna. The base station may be configured to transmit wireless, cellular communications signals comprising a sequence of radio frames via the at least one base station antenna. The mobile communications device may comprise one or more antennas and processing circuitry operably coupled to the one or more antennas to support wireless, cellular communications with the base station. The processing circuitry of the mobile communications device may be configured to receive, via the one or more antennas, a first signal capture from a first wireless, cellular communication signal transmitted by the base station. In this regard, the first signal capture may be a portion of a first radio frame. The processing circuitry of the mobile communications device may be further configured to align the first signal capture to determine a location of a start of a first symbol in the first signal capture and decode data within the first signal capture to generate a first capture grid based on the location of the start of the first symbol in the first signal capture. The processing circuitry of the mobile communications device may be further configured to receive, via the one or more antennas, a second signal capture from a second wireless, cellular communication signal transmitted by the base station. The second signal capture may be one or more radio frame durations after the first signal capture. The second signal capture may be a portion of a second radio frame. The processing circuitry of the mobile communications device may be further configured to align the second signal capture to determine a location of a start of a second symbol in the second signal capture, and decode data within the second signal capture to generate a second capture grid based on the location of the start of the second symbol in the second signal capture. The processing circuitry of the mobile communications device may be further configured to combine the first capture grid with the second capture grid to generate a resultant grid. The resultant grid may indicating positions of reference symbols that are commonly located within both the first capture grid and the second capture grid. The processing circuitry of the mobile communications device may be further configured to determine a subset of possible physical cell identifiers based on a position of a selected reference symbol within the resultant grid, and perform a search of the subset of possible physical cell identifiers to identify a current cell identifier corresponding to the base station for the mobile communications device.

BRIEF DESCRIPTION OF THE SEVERAL VIEWS OF THE DRAWING(S)

Having thus described some embodiments in general terms, reference will now be made to the accompanying drawings, which are not necessarily drawn to scale, and wherein:

DETAILED DESCRIPTION

Figure 1:
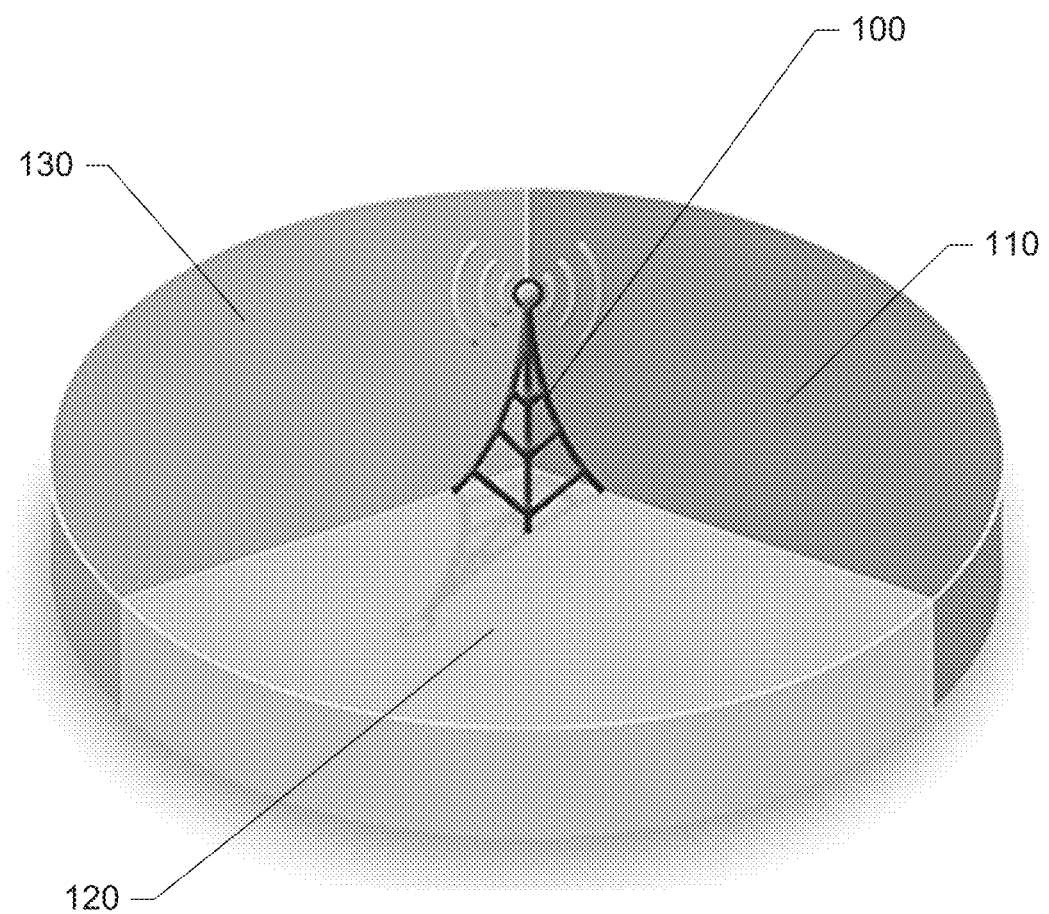
FIG. 1 is an illustration of an LTE base station and surrounding cells according to some example embodiments.

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout.

According to various example embodiments, methods, apparatuses, and systems are provided for determining a physical cell identifier (PCI) and other parameters for a current cell of a mobile communications device (e.g., user equipment (UE)), where the PCI and other parameters such as the subframe and symbol, may be used to support ongoing communications involving a cell of a base station or used to prevent communications involving a cell of a base station. According to some example embodiments, the PCI may be determined when the primary synchronization signal (PSS) and a secondary synchronization signal (SSS) have not been obtained by the mobile communications device, but partial frames or portions of frames can be received. To do so, according to some example embodiments, a relationship between the positioning of reference signals within a reference symbol in a radio frame of long term evolution (LTE) systems and the PCI can be leveraged to substantially reduce the set of possible PCIs when a search (e.g., a blind search) is performed to determine a current PCI for the mobile communications device. Due to the substantial reduction in the set of possible PCIs, the time required to search through the remaining possible PCIs to identify the current PCI for the mobile communications device is also substantially reduced thereby leading to improvements in system performance and reliability.

In this regard, according to some example embodiments, when a partial frame is received, the partial frame may include reference symbols, but the mobile communications device may not yet be able to decipher the portion of the partial frame that corresponds to a reference symbol. Based on, for example, the LTE standard, reference signals within the reference symbols may be shifted based on the number value of the PCI. The shifting of the reference signals can operate to prevent interference between neighboring base stations with respect to these reference signals. However, this shifting also imparts information about the number value of the PCI and can serve as basis for reducing the possible PCI's for the current cell when performing a search.

To reduce the set of possible PCIs and simplify a search, according to some example embodiments, the mobile communications device may undertake a process to analyze the positioning of the reference symbols and then positioning of the reference signals within the received partial frame, which may also be referred to as a first signal capture. In this regard, after receipt, the mobile communications device may be configured align the first signal capture to identify the beginning or start of one or more symbols (e.g., orthogonal frequency-division multiplexing (OFDM) symbols) within the partial frame and decode the partial frame into a first capture grid. The mobile communications device may then obtain a second signal capture or second partial frame at a time that is one frame duration after the first signal capture (e.g., 10 ms later), and is therefore time aligned with the first signal capture. The mobile communications device may then align the received second partial frame to identify the beginning or start of one or more symbols within the second partial frame and decode the second partial frame into a second capture grid.

At this point, the mobile communications device may have the first and second capture grids, but positions of the reference symbols within capture grids may still be unknown. Because the reference symbols appear in the same position within each frame, computations can be performed on the capture grids to determine which symbols are reference symbols, and the positioning of the reference signals within the reference symbols, due to the reference signals having a same value and the same relative positions. As such, the capture grids may be combined to generate a resultant grid that indicates the positions from which the reference symbols and reference signals can be determined. In this regard, a complex conjugate multiplication of the capture grids may be performed to determine a product grid. Subsequently, the product grid may be further simplified by performing a sum across frequencies (e.g., sub-carriers) to generate the resultant grid. Subsequently, the resultant grid may be analyzed based on, for example, the energy of the elements disposed within the resultant grid to identify the reference elements that correspond to reference signals and their respective positions. For example, the reference signals may be positioned where the elements exceed a threshold energy. Additionally, upon determining the positions of the reference signals, values (e.g., energy values) of the reference signals may also be determined, and the values of the reference signals may be used to determine a position of a subframe and a reference symbol that includes the reference signal within a frame.

According to some example embodiments, a reference signal may be positioned in one of six possible positions within a first column of the resultant grid. Based on which of the six positions the reference signal is located, a subset of possible PCI values can be identified and that subset can be searched against to determine the current PCI. As such, according to some example embodiments, a search, such as a blind search, may be performed on a subset of possible PCI values, where the subset includes PCI values that are associated with the respective position within the resultant grid.

In consideration of the above and to provide context, FIG. 1 illustrates an LTE base station 100 and surrounding cells 110, 120, and 130, according to some example embodiments. In this regard, the LTE base station 100 may include one or more antennas to communicate to a mobile communications device in the geographic area surrounding the base station 100. As shown in FIG. 1, the surrounding geographic area may be divided into three regions or cells 110, 120, and 130, each of which extending away from the base station 100. Each of the cells 110, 120, and 130 may be assigned a PCI. The PCI value for a given cell may be any number from 0 to 503, according to some example embodiments.

Figure 2:
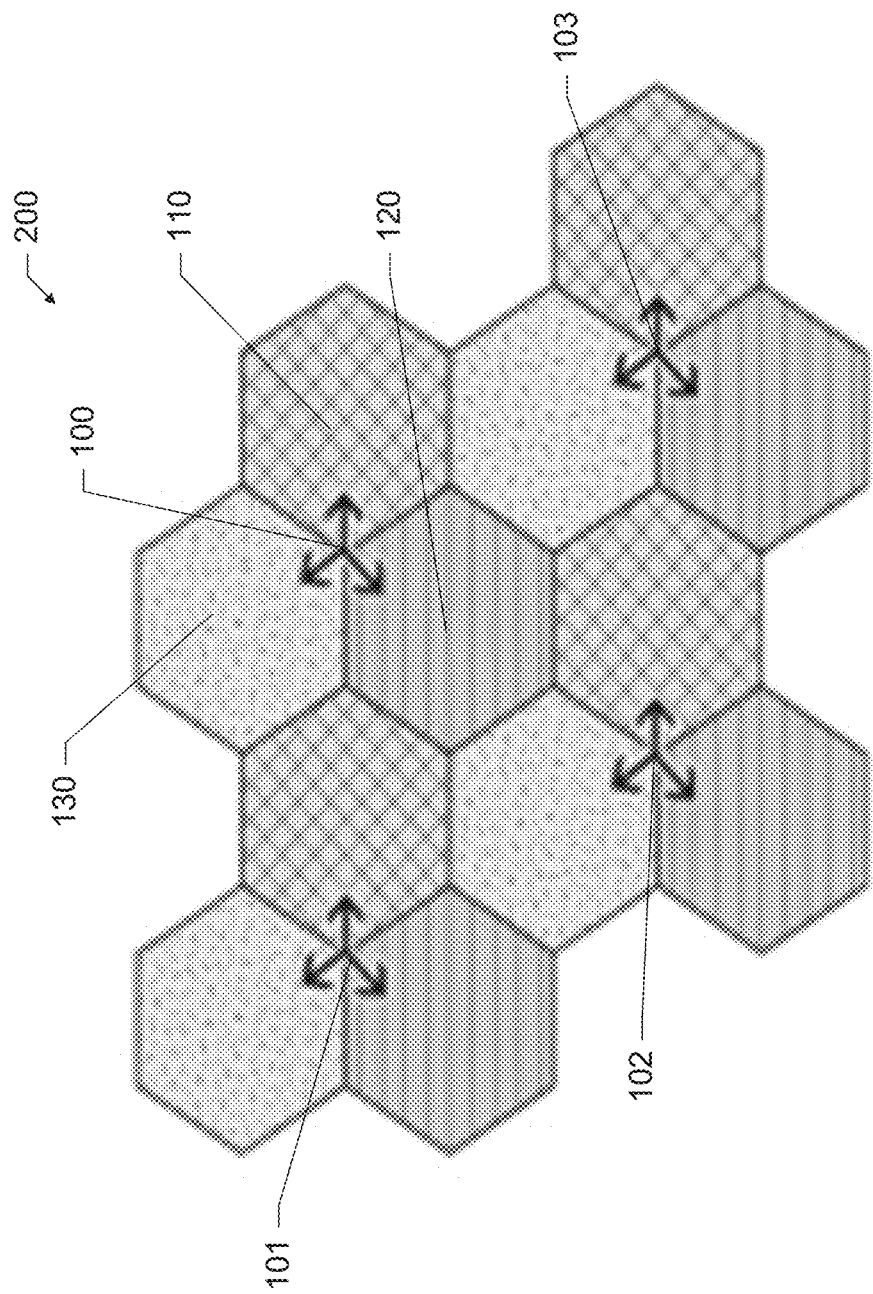
FIG. 2 illustrates an LTE system defined over a larger geographic area divided into cells and including multiple base stations according to some example embodiments.

FIG. 2 illustrates an LTE system 200 defined over a larger geographic area divided into cells, according to some example embodiments. The LTE system 200 includes the base station 100 having cells 110, 120, and 130. The LTE system 200 also includes additional base stations 101, 102, and 103. As can be seen, each base station 100, 101, 102, and 103 may have three corresponding cells surrounding the respective base station. Each of these cells may be assigned a PCI. Because a mobile communications device may receive communication signals from more than one base station, the PCI value for a cell may be assigned such that no two nearby cells have the same PCI so that the mobile communications device is not interacting with two cells having the same PCI.

Having described the geographic architecture of base stations and cells within an LTE system, a description of the frame structure of the communications from the LTE base stations will now be provided, according to some example embodiments. In this regard, with reference to FIG. 3, a frame structure 300 is provided. As a shown, a frame may include ten subframes, with each subframe including two slots. The frame may, for example, be 10 ms in duration, with a subframe having a duration of 1 ms, and a slot having a duration of 0.5 ms. Each slot may include seven OFDM symbols. Each symbol may include a respective cyclic prefix. Since a slot includes seven symbols, each subframe may include fourteen symbols.

Figure 4:
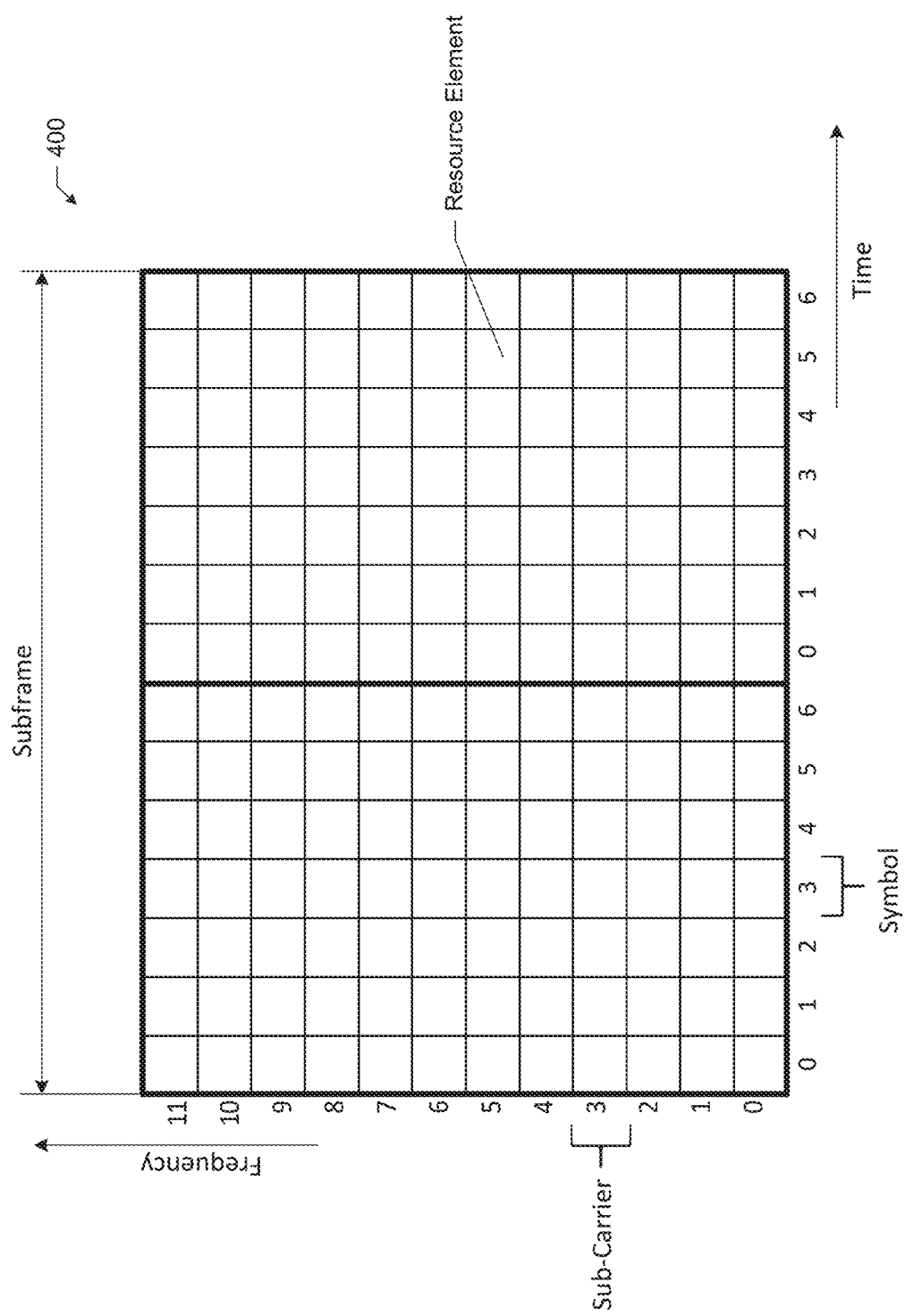
FIG. 4 illustrates a subframe grid with respect to subcarriers according to some example embodiments.

FIG. 4 illustrates a subframe grid 400 further broken down by sub-carrier to show specific resource elements. The example subframe grid 400 includes two resource blocks with each column of the subframe grid 400 corresponds to a symbol and each row corresponds to a sub-carrier. The sub-carrier spacing may be 15 kHz. As such, the axes of the subframe grid 400 are frequency on the y-axis and time on the x-axis. In some instances, a subframe may include additional sub-carriers and, along the frequency axis, may include a number of resource blocks (e.g., in the frame 500 in FIG. 5, a subframe is six resource blocks along the frequency axis). Each position (or block) within the subframe grid 400 may be referred to as a resource element. A resource element may be a defined unit of one OFDM sub-carrier over one OFDM symbol interval. A resource element may include information that may be related to communications overhead (e.g., a reference signal) or communications payload. In some instances, such as in a single input single output (SISO) mode, a resource element may be a reference signal (e.g., the position designated by the resource element may be populated by a reference signal), which may be followed by a second reference signal shifted by six sub-carriers within the same reference symbol. As such, a reference symbol may include one or more (e.g., a set) of reference signals, in addition to other information in resource elements not allocated to reference signals. For modes other than SISO (e.g., multiple input multiple output (MIMO) modes such as two port and four port modes), additional reference signals can exist and positions of the additional reference signals may be determined as described herein. As such, symbols that include these reference signals can be referred to as reference symbols. The placement of the reference signals can provide information about the PCI of the cell as described above.

Figure 5:
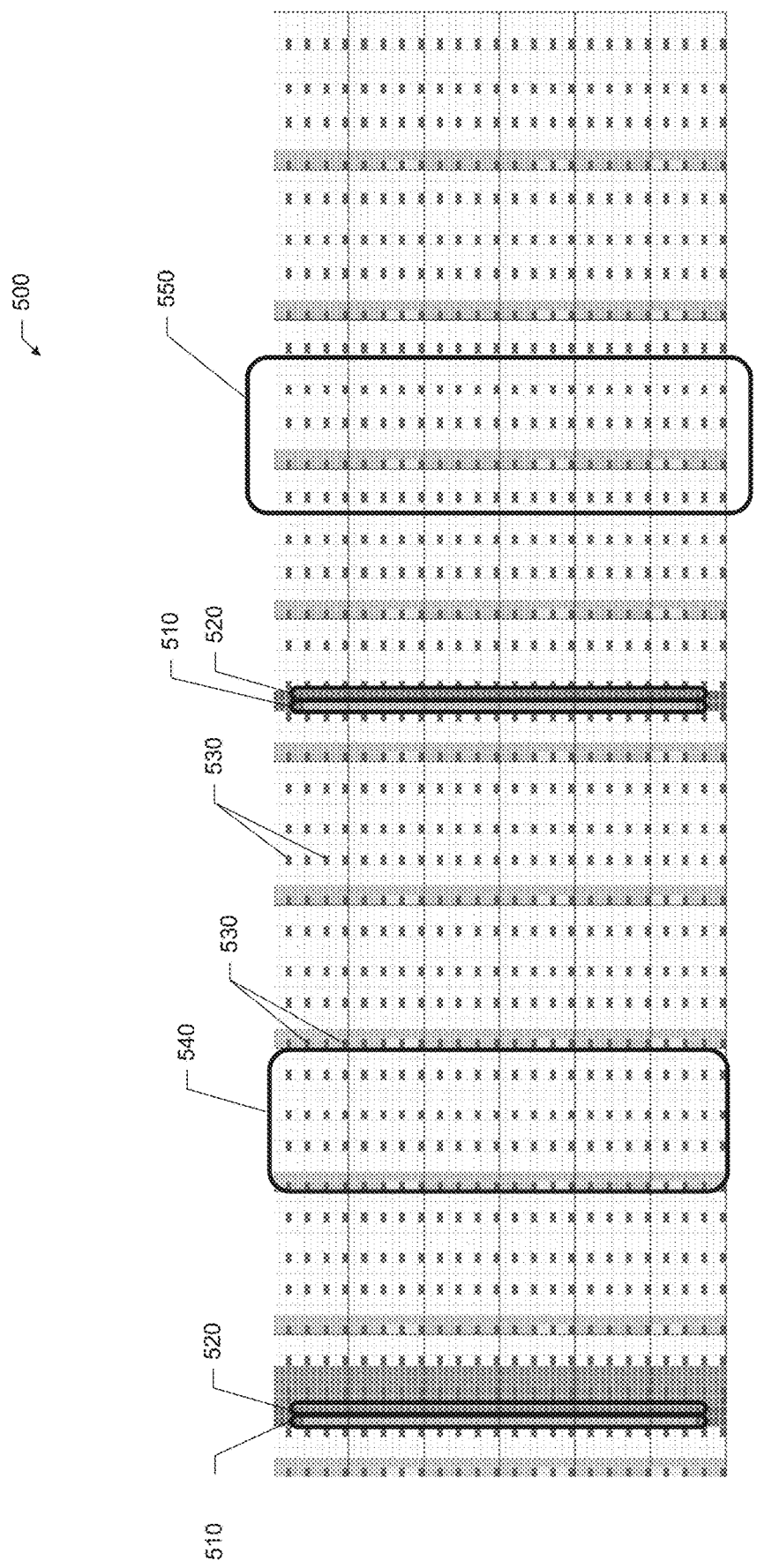
FIG. 5 illustrates an example LTE frame according to some example embodiments.

FIG. 5 illustrates an example frame 500 that includes additional sub-carriers to, for example, support a higher bandwidth. The frame 500 is shown as a complete frame and therefore includes the SSS at 510 and the PSS at 520. Additionally, a single example subframe is shown at 540. Further, the resource elements at 530 may be reference signals within reference symbols, where a symbol is a column of the frame 500. As further described herein, according to some example embodiments, a mobile communications device may receive a partial frame, such as the portion at 550, and a mobile communications device may be configured to determine information about the PCI, even though the placement of the partial frame within the frame may not be initially known, may not include the PSS or the SSS, and may not be aligned to a symbol, or subframe.

Figure 6:
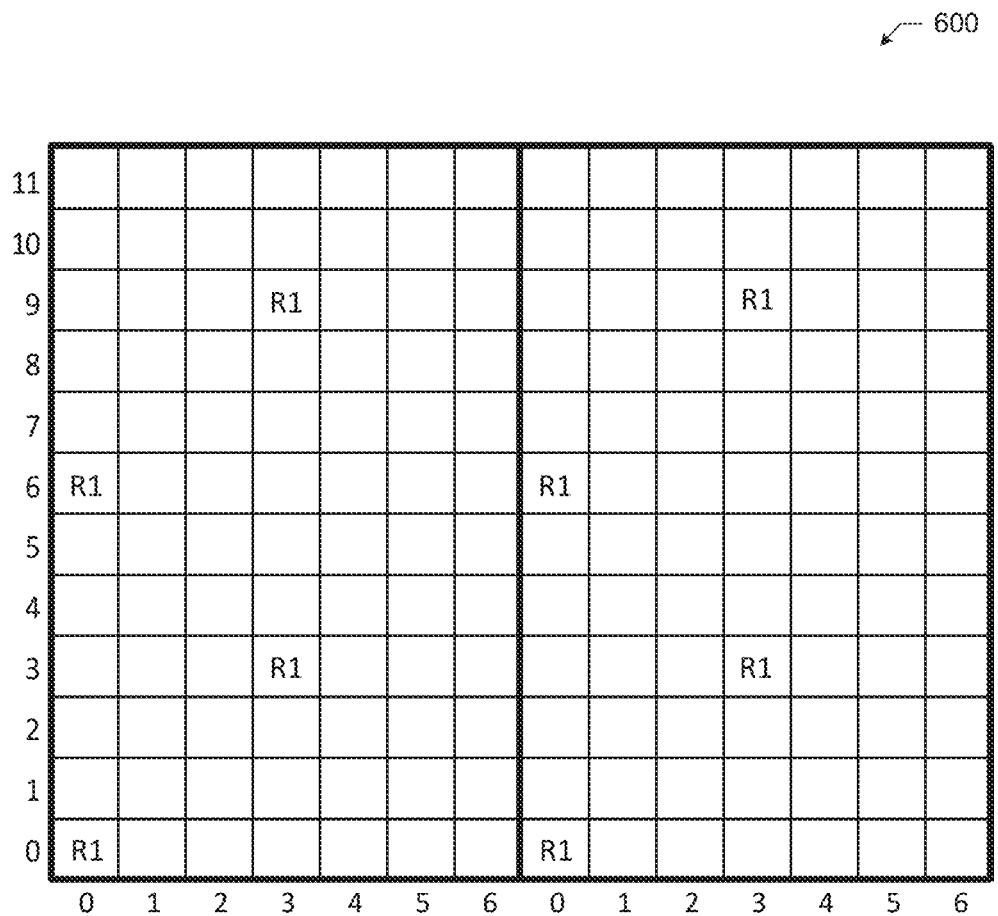
FIG. 6 illustrates another subframe grid with indicated reference signals according to some example embodiments.

FIG. 6 illustrates a two resource blocks grid 600, which could be a portion of the frame, however with example positions for the reference signals (indicated by the "R1" for the reference signals) provided. This example two resource block grid 600 may be indicative of the placement of the reference signals for a single antenna port of a mobile communications device. Additional reference signals may be included for a two or four port antenna structure.

Figure 7:
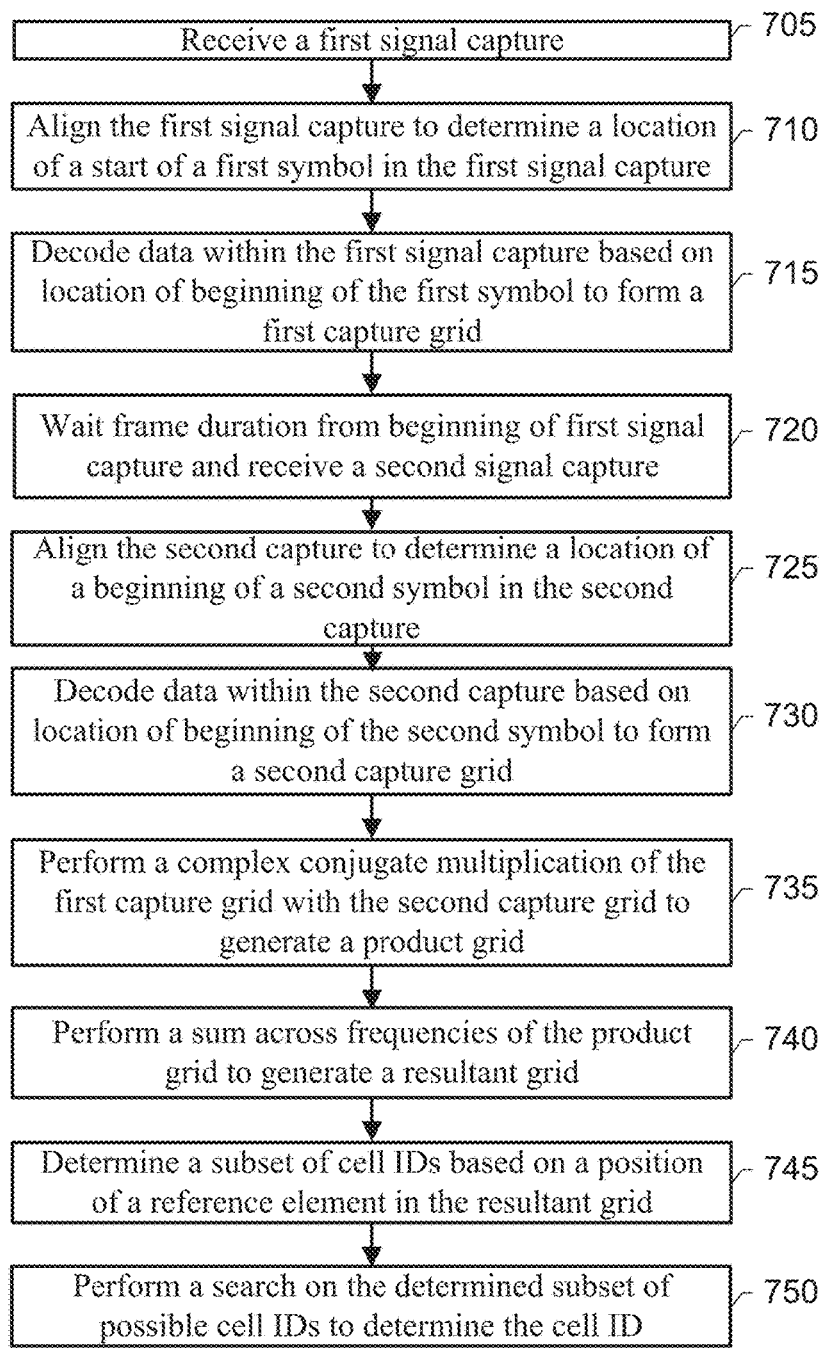
FIG. 7 illustrates an example method for determining a cell ID according to some example embodiments.

Based on the context provided, an example method for determining the PCI (also referred to as the cell ID) is provided in FIG. 7. The operations of the method of FIG. 7 may, according to some example embodiments, be performed by a mobile communications device, and more specifically, processing circuitry of a mobile communications device (e.g., processing circuitry 910 of mobile communications device 900). It is understood that the operations of the example method may be performed in the sequence as provided, or in another sequence.

In this regard, at 705, the example method may include receiving a first signal capture. The signal capture may be a capture of a partial frame (i.e., a portion of a first LTE frame), as described above, that does not include the PSS and the SSS. The first signal capture may be received by a mobile communications device via an antenna of the mobile communications device from a nearby LTE base station as a wireless, cellular communication transmission.

Figure 3:
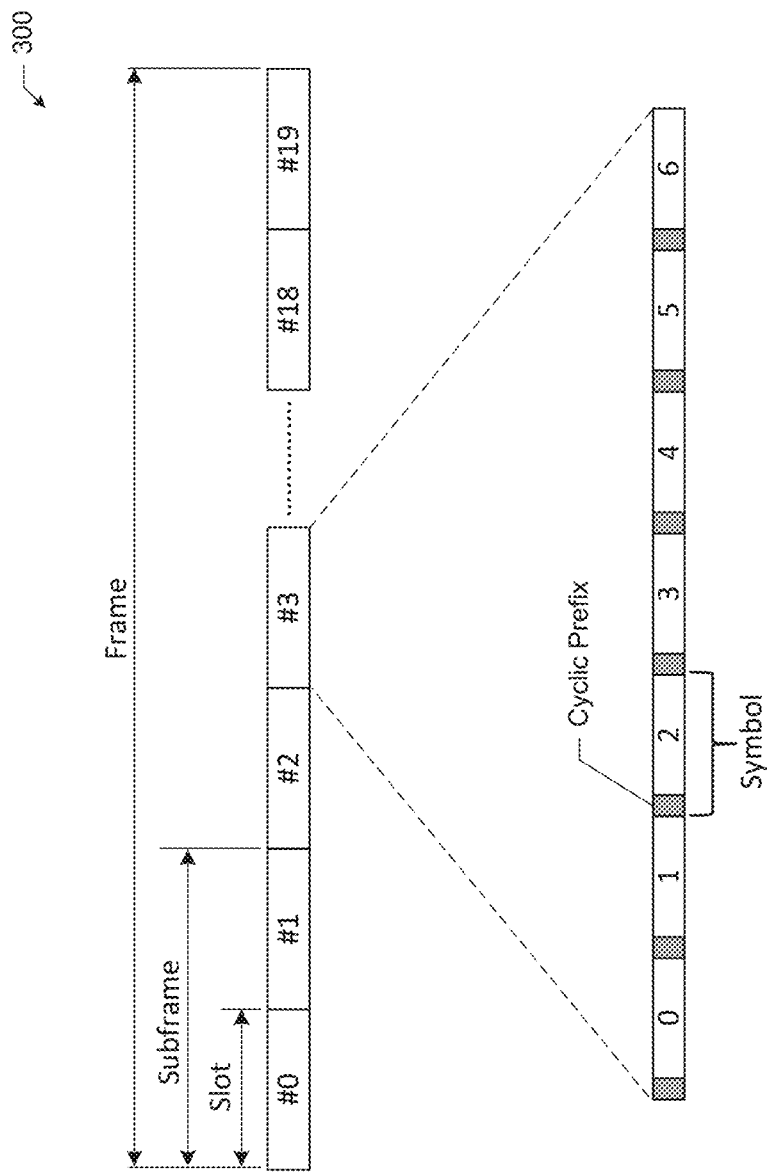
FIG. 3 is an illustration of an LTE frame structure according to some example embodiments.

The example method may continue at 710 with aligning the first signal capture to determine a location of a start of a first symbol in the first signal capture. In this regard, the first signal capture may be time and frequency aligned to begin the process of orienting the first signal capture within a frame. To do so, the data of the first signal capture may be analyzed to identify one or more cyclic prefixes, which may be leveraged to locate a beginning or start of a symbol (as indicated in FIG. 3). By aligning the first signal capture, the frequencies or subcarrier alignment and symbol alignment may be realized, but the location of the symbols within the frame may still be unknown, and, as such, the identity of a symbol as being a reference symbol may also be unknown.

However, with the first signal capture aligned with respect to frequency and symbols, the data within the first signal capture may be decoded at 715. As mentioned above, the location of the beginning of a symbol within the first signal capture may be leveraged to perform the decoding. According to some example embodiments, to decode the information within the first signal capture, a demodulation process may be performed. Upon decoding the data within the first signal capture, a first capture grid may be formed. The first capture grid may have frequency or subcarriers on a first axis (e.g., the y-axis) and time in symbols on a second axis (e.g., the x-axis). The decoded elements of the first capture grid may include resource elements as described with respect to FIG. 4, but the identity of the resource elements, particularly those that are reference signals, may not yet be known.

The example method may further include waiting or delaying a frame duration (e.g., 10 ms) from the beginning of the first signal capture, and then obtaining and receiving a second signal capture at 720. In this regard, the delay associated with the second signal capture may be included in order to receive a partial frame from a different frame from that of the first signal capture. The second signal capture may therefore be a capture of a partial frame (i.e., a portion of a second or subsequent LTE frame in time), as described above, that does not include the PSS and the SSS, but is time aligned, relative to a frame, with the first signal capture. The second signal capture may be received by a mobile communications device via an antenna of the mobile communications device from a nearby LTE base station as a wireless, cellular communication transmission.

Similar to the treatment of the first signal capture, the second signal capture may be aligned to determine a location of a start of a symbol, e.g., a second symbol, in the second signal capture at 725. In this regard, the second signal capture may be time and frequency aligned to begin the process of orienting the second signal capture within a frame. To do so, the data of the second signal capture may be analyzed to identify one or more cyclic prefixes, which may be leveraged to locate a beginning or start of the symbol (such as, but not limited to, the second symbol) as indicated in FIG. 3. By aligning the second signal capture, the frequencies or subcarrier alignment and symbol alignment may be realized, but the location of the symbols within the frame may still be unknown, and, as such, the identity of a symbol as being a reference symbol may also be unknown.

Again, similar to the first signal capture, the data within the second signal capture may be decoded at 730. As mentioned above, the location of the beginning of a second symbol within the second signal capture may leveraged to perform the decoding. According to some example embodiments, to decode the information within the second signal capture, a demodulation process may be performed. Upon decoding the data within the second signal capture, a second capture grid may be formed. The second capture grid may have frequency or subcarriers on a first axis (e.g., the y-axis) and time in symbols on a second axis (e.g., the x-axis). The decoded elements of the second capture grid may include resource elements as described with respect to FIG. 4, but the identity of the resource elements, particularly those that are reference signals, may not yet be known.

The example method may also include combining the first capture grid with the second capture grid to generate a resultant grid. To combine the first capture grid with the second capture grid, according to some example embodiments, a complex conjugate multiplication may be performed at 735 to form a product grid. According to some example embodiments, to perform the complex conjugate multiplication, a conjugate of one of the capture grids may be taken and then the other grid may be multiplied by that conjugate to form the product grid. The complex conjugate multiplication of the capture grids may operate to cause the values in the capture grids that are the same to be emphasized with significantly higher values (e.g., energy values). The product grid that is formed may be a 14 by 6 grid.

Further, according to some example embodiments, since the second signal capture may be obtained one frame duration later (or an integer multiple of a frame duration later), the first signal capture and the second signal capture may be time-aligned with respect to a position within their respective frames. As such, after the time and frequency alignment is performed, the complex conjugate multiplication may operate to multiply values of resource elements that are placed in the same location in the respective frames. Therefore, if commonly placed resource elements in each of the capture grids have the same values, the complex component of the sum may become real and emphasized (e.g., be squared) and the real component of the sum may remain and be emphasized (e.g., be squared) by the multiplication operation, and the overall effect may be to add the emphasized real part with the emphasized imaginary part that has become real to further emphasize the energy in that resource element location. According to some example embodiments, because the reference signals have the same values between the frames, the multiplication operation can have this effect on the resource elements that include reference signals (e.g., no complex component). Other resource elements that do not include reference signals may multiply and obtain a result that includes both real and complex components, and will not be emphasized.

While according to some example embodiments, the positions of the reference signals, and thus the reference symbols, may be determined from the product grid. However, the combination of the capture grids may also include performing a coherent or incoherent sum across frequencies of the product grid at 740 to generate a resultant grid. To do so, according to some example embodiments, performing the sum may include overlaying a second portion of the product grid (e.g., the second 6 columns by 7 rows of the product grid) on a first portion of the product grid (e.g., the first 6 columns by 7 rows of the product grid), and adding the values in the resource blocks either incoherently or coherently. By performing this summation, the resource blocks that include the reference signals are further emphasized. Further, performing the sum may operate to reduce the product grid down in size to a fundamental form that indicates the positions of the reference signals. In this regard, the resultant grid, according to some example embodiments, may be a seven by six grid (or matrix) that includes emphasized values in the positions of the reference signals. The emphasized values may be determined relative to a defined absolute threshold value (e.g., energy value) or a relative threshold value (e.g., energy value) in consideration of the other values in the resultant grid.

Figure 8A:
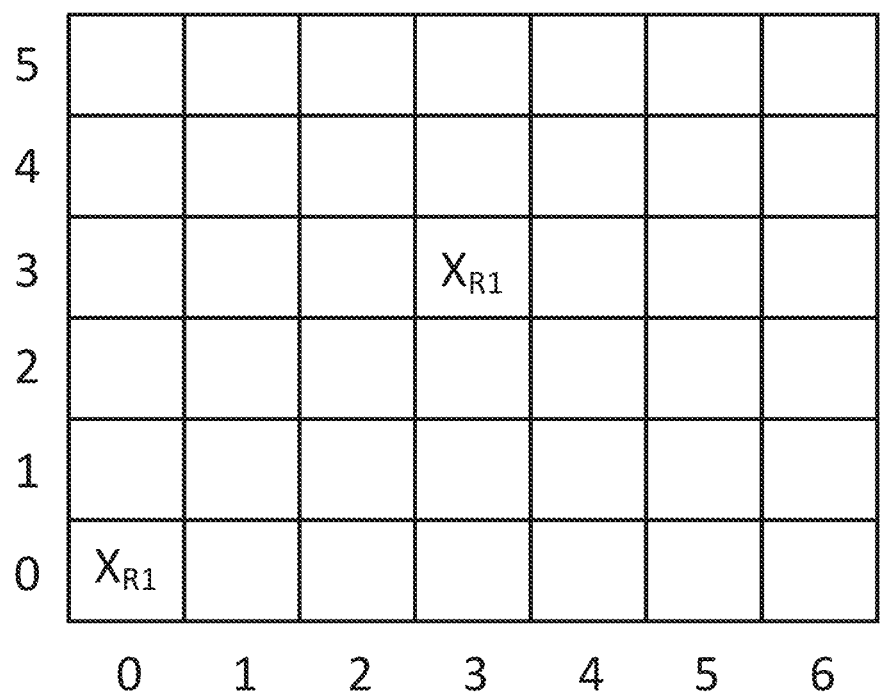
FIGS. 8A and 8B illustrate example resultant grids according to some example embodiments.

In this regard, FIG. 8A illustrates an example resultant grid 800. Resultant grid 800 is a seven by six grid. The emphasized values that, for example, exceed a threshold (e.g., an energy threshold), may be considered reference elements due to their computational relationship with reference signals. As such, in the example resultant grid 800, the reference elements may be located at positions (0,0) and (3,3) and indicated by "$X_{R1}$". According to various example embodiments, an analysis of the resultant grid 800 may be performed to determine the positions of the reference elements.

According to some example embodiments, a further operation of averaging may be performed on the resultant grid to further emphasize the reference elements. In this regard, a non-coherent or coherent averaging of the slot may be performed on the values of the resultant grid. The averaging may operate to further emphasize the reference signal locations.

Ultimately, according to some example embodiments, the position of the first reference element in the example resultant grid 800 is shown to be at (0,0) or in the first position along the y-axis. Based upon the position of the first reference element being in one of the first to sixth positions (corresponding to 0 to 5 as shown in the resultant grid 800) along the y-axis, a subset of cell IDs (i.e., PCIs) may be determined at 745. In this regard, according to some example embodiments, a position of the reference element may indicate a subset of possible options for the value of the current cell ID for the mobile communications device that received the first and second signal captures. In this regard, if the reference element is disposed in the first position, and an additional reference element is disposed in the third column of the third row, the subset of optional cell IDs may be {0, 6, 12, 18 . . . 498}. If the reference element is disposed in the second position of the first column, and the forth position of the third row, the subset of cell ID's may be (1,7,13,19, . . . 499). An equation for the possible cell ID may be written as {position number in first column+6*(0 to 167)}. The subset of possible cell IDs is therefore reduced from all options to one sixth of all possible options for the cell ID value. As such, based upon the positioning of the reference element in the resultant grid, a subset of cell IDs may be determined.

Similarly, the number of the reference symbol may be determined from the resultant grid (e.g., result. In this regard, for example, if the reference element is in the first and forth column, then the reference symbol may be number 0 or 7. If the reference element is in the second and fifth column, then the reference symbol may be number 1 or 8. If the reference element is in the fifth and eighth column, then the reference symbol may be number 4 or 11. By determining the position of the reference symbol in the resultant grid 800, the position of the first symbol of the resultant grid, and thus the alignment of the resultant grid to a subframe boundary transmitted by a base station may be determined. (e.g. if the reference symbol number is 0 or 7, the first symbol of the resultant grid is 0 or 7 while if the reference symbol number is 1 or 8 the first symbol of the resultant grid is 6 or 13). Using the reference symbol number, the size of the search space can be further reduced.

Figure 8B:
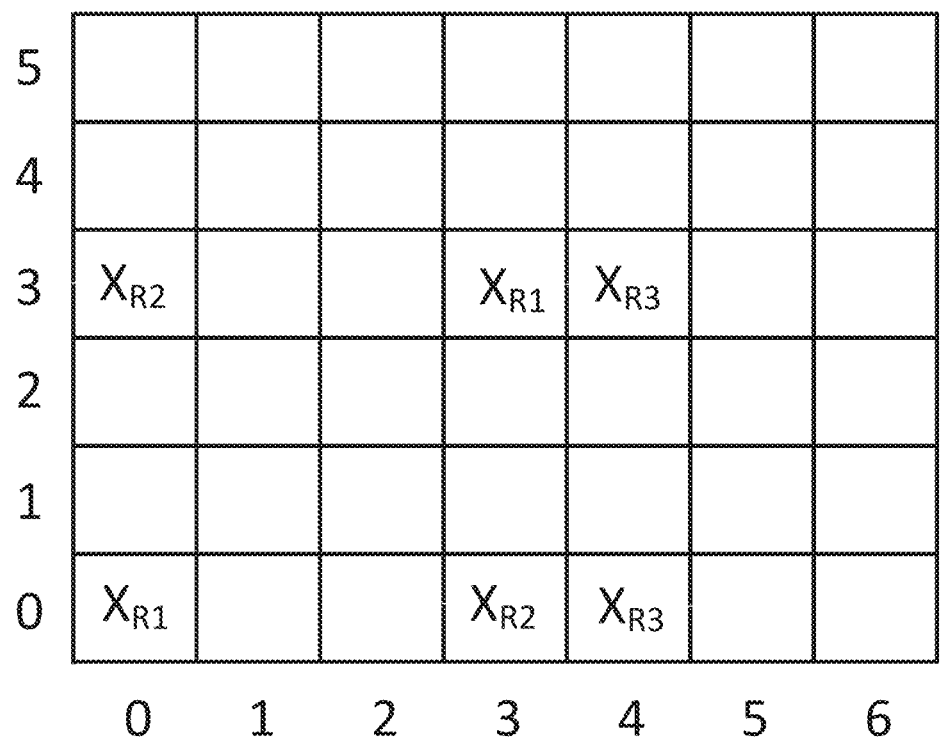

As mentioned above, the example resultant grid 800 is for a single port, according to some example embodiments. However, the resultant grid may be indicate additional information regarding the cell configuration. As an example, as illustrated in the resultant grid 810 of FIG. 8B, if both reference signals R1 and R2 exist, then the position of the additional reference elements $X_{R2}$ may indicate a 2 port MIMO cell configuration. If reference signals R1, R2 and R3 exist, then the position of the additional reference elements $X_{R3}$ this may indicate a 4 port MIMO configuration.

Subsequently, based on the determined subset of cell IDs, a search may be performed to determine the actual, current cell ID for the mobile communications device at 750. In this regard, the search may be performed as a blind search of the remaining cell ID options in subset. The blind search may involve comparing the capture grids to templates for each of the cell ID options to identify a match. According to some example embodiments, the search may be performed as an iterative process to determine the current cell ID for the mobile communications device. According to some example embodiments, a blind search procedure may include aligning a signal capture (e.g., the first or second signal capture according to operation 710 or 725) to determine a start of a symbol and decoding the signal capture into a grid (e.g., according to operations 715 or 730), if not already performed. According to some example embodiments, based on an assumed symbol number (e.g., 0 to 13 or a determined subset thereof) in an assumed subframe (e.g., 0 to 9 or a determined subset thereof) with an assumed cell ID as selected from the determined subset of cell IDs, each possible permutation may be selected and values from the decoded grid may be extracted corresponding to the reference signals defined by each permutation of the symbol number, subframe, and cell ID. Based on, for example, specified relationships (e.g., from the LTE specification), expected values of the reference signals may be determined and form a sequence based on the permutations. A conjugate multiplication and coherent or incoherent sum across the sequence may be performed between the values decoded and extracted from the resultant grid and each permutation of expected values. The permutation having the highest values (e.g., energy values) can indicate a solution, and thus a subframe and cell ID associated with the signal capture. Note that while some example embodiments, are directed to example methods that leverage two signal captures or partial frames, it is contemplated that more than two signal captures that are time aligned by frames may be used. In this regard, the combination of capture grids may be performed on a larger scale and may involve incrementally more computations based on the number of signal captures used. However, according to some example embodiments, an improvement in the quality of the results may be realized since the resultant grid may be dependent upon additional information.

Figure 9:
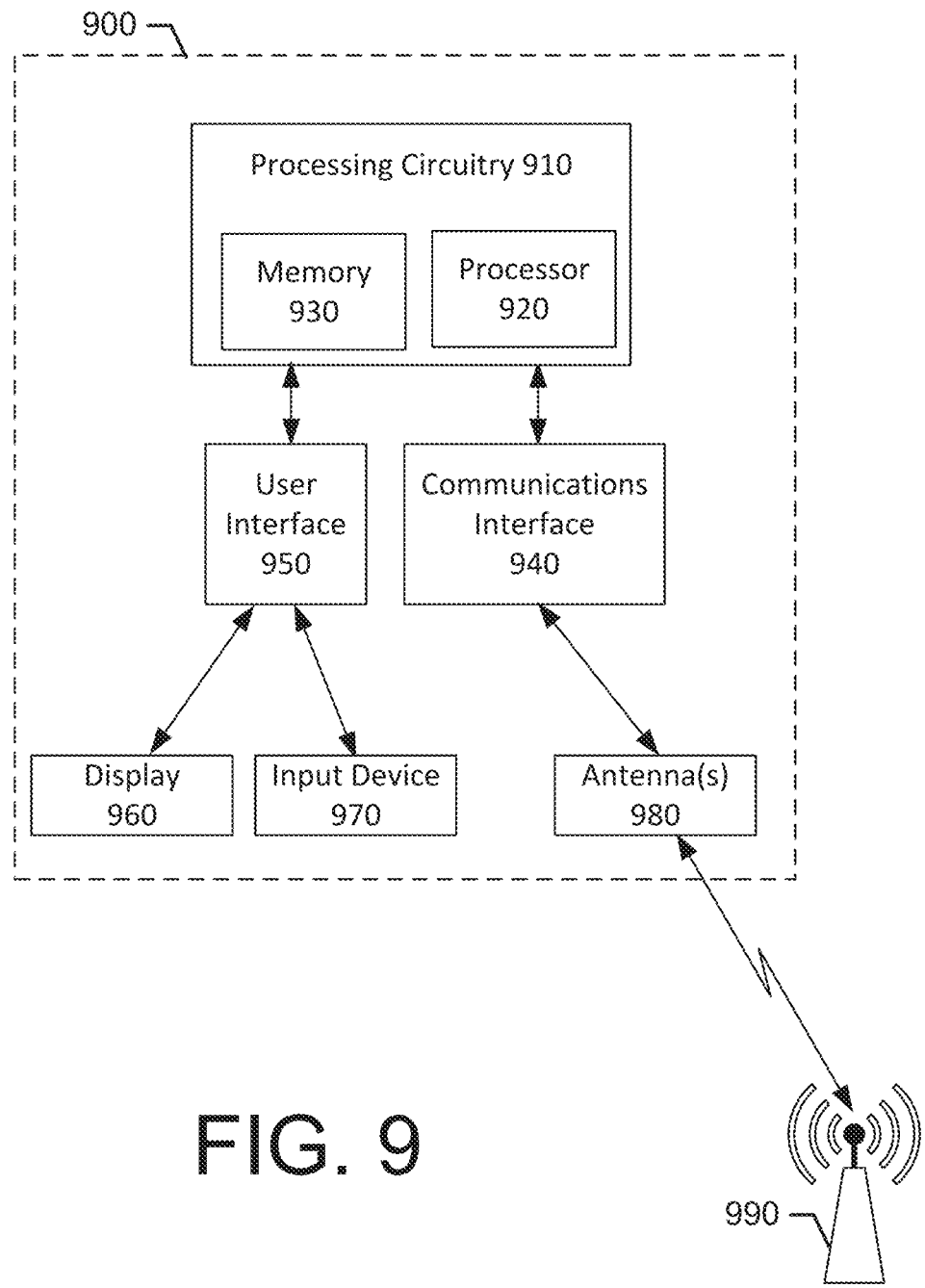
FIG. 9 shows an exemplary diagram of an LTE communications system including a mobile communications device and a base station according to some example embodiments.

FIG. 9 provides a block diagram of an example system comprising a mobile communications device 900 (e.g., cellular user equipment) and a base station 990 that communicates LTE frames to the mobile communications device 900 for analysis (e.g., performance of the example methods of FIG. 7), as provided herein. In this regard, the base station 990 may comprise at least one base station antenna and base station processing circuitry configured to cause the base station 990 to transmit wireless, cellular communications signals comprising a sequence of LTE frames.

The block diagram of the mobile communications device 900 includes some internal components that may be used to operate a mobile communications device as described herein, particularly with respect to implementation of the example methods described with respect to FIG. 7. In this regard, the mobile communications device 900 may comprise processing circuitry 910 that may be in operative communication with or embody, a communications interface 940, and a user interface 950. The processing circuitry 910 may interact with or embody a memory 930 and a processor 920. The processing circuitry 910 may be configurable to perform operations described herein. In this regard, the processing circuitry 910 may be configured to perform computational processing and memory management according to an example embodiment. In some embodiments, the processing circuitry 910 may be embodied as a chip or chip set. In other words, the processing circuitry 910 may comprise one or more physical packages (e.g., chips) including materials, components or wires on a structural assembly (e.g., a baseboard). The processing circuitry 910 may be configured to receive inputs (e.g., via peripheral components such as user interface 950, communications interface 940, or internally, such as, via the memory 930), perform actions based on the inputs, and generate outputs (e.g., for provision to peripheral components). In an example embodiment, the processing circuitry 910 may include one or more instances of a processor 920, associated circuitry, and memory 930. As such, the processing circuitry 910 may be embodied as a circuit chip (e.g., an integrated circuit chip, such as a field programmable gate array (FPGA)) configured (e.g., with hardware, software or a combination of hardware and software) to perform operations described herein.

In an example embodiment, the memory 930 may include one or more non-transitory memory devices such as, for example, volatile or non-volatile memory that may be either fixed or removable. The memory 930 may be configured to store information, data, applications, instructions or the like for enabling, for example, cellular communications and to carry out various functions in accordance with exemplary embodiments. For example, the memory 930 could be configured to buffer input data for processing by the processing circuitry 910. Additionally or alternatively, the memory 930 could be configured to store instructions for execution by the processing circuitry 910. Among the contents of the memory 930, applications may be stored for execution by the processing circuitry 910 in order to carry out the functionality associated with each respective application.

As mentioned above, the processing circuitry 910 may be embodied in a number of different ways. For example, the processing circuitry 910 may be embodied as various processing means such as one or more processors 606 that may be in the form of a microprocessor or other processing element, a coprocessor, a controller or various other computing or processing devices including integrated circuits such as, for example, an ASIC (application specific integrated circuit), an FPGA, or the like. In an example embodiment, the processing circuitry 910 may be configured to execute instructions stored in the memory 930 or otherwise accessible to the processing circuitry 910. As such, whether configured by hardware or by a combination of hardware and software, the processing circuitry 910 may represent an entity (e.g., physically embodied in circuitry—in the form of processing circuitry 910) capable of performing operations according to example embodiments while configured accordingly. Thus, for example, when the processing circuitry 910 is embodied as an ASIC, FPGA, or the like, the processing circuitry 910 may be specifically configured hardware for conducting the operations described herein. Alternatively, as another example, when the processing circuitry 910 is embodied as an executor of software instructions, the instructions may specifically configure the processing circuitry 910 to perform the operations described herein.

The communications interface 940 may include one or more interface mechanisms for enabling communication with other devices external to mobile communications device 900, via, for example, a network via the base station 990. In some cases, the communications interface 940 may be any means such as a device or circuitry embodied in either hardware, or a combination of hardware and software that is configured to receive or transmit data from/to devices in communication with the processing circuitry 910. The communications interface 940 may be a wired or wireless interface and may support various communications protocols.

The communications interface 940 may be operably coupled to one or more antennas 980. In this regard, the mobile communications device 900 may include one more antennas 980 to support communications on a cellular communications system, such as an LTE system. According to some example embodiments, the communications interface 940 may be configured to operate multiple antennas to support communications in a MIMO mode.

The user interface 950 may be controlled by the processing circuitry 910 to interact with a user. In this regard, via the user interface 950, the processing circuitry 910 may be configured to output to a user via an output device such as, for example, driving a display 960 and receive input from a user via an input device such as, for example, input device 970, which may be, for example, a touch screen, buttons, a camera, a microphone, a keyboard, a mouse, or the like. The user interface 950 may also produce outputs, for example, via the display 960, a speaker, haptic feedback systems, or the like.

In an example embodiment, the processing circuitry 910 may be embodied as, include or otherwise control, the mobile communications device 900 to perform object recognition and presentation as described herein. As such, in some embodiments, the processing circuitry 910 may be said to cause each of the operations described in connection with, for example, the methods 100 and 200, the method of FIG. 7, and the functionalities otherwise described herein. The processing circuitry 910 may therefore undertake the corresponding functionalities responsive to execution of instructions or algorithms configuring the processing circuitry 910 accordingly. The processing circuitry 910 may provide programmable control signals, selections, and the like to control the operation of the mobile communications device 900 responsive to execution of instructions stored in the memory 930.

As such, according to some example embodiments, the processing circuitry 910 may be configured to support wireless, cellular communications with a long term evolution (LTE) base station (base station 990). The processing circuitry 910 may be further configured to perform the operations described with respect to the example methods of FIG. 7. In this regard, the processing circuitry may be configured to receive, via antennas 980, a first signal capture from a first wireless, cellular communication signal transmitted by the LTE base station, where the first signal capture may be a portion of a first LTE frame (i.e., a partial LTE frame). The processing circuitry 910 may also be configured to align the first signal capture to determine a location of a start of a first symbol in the first signal capture and decode data within the first signal capture to generate a first capture grid based on the location of the start of the first symbol in the first signal capture.

Additionally, the processing circuitry 910 may be configured to receive, via the antennas 980, a second signal capture from a second wireless, cellular communication signal transmitted by the LTE base station. In this regard, the second signal capture may be one or more LTE frame durations after the first signal capture and the second signal capture being a portion of a second LTE frame (i.e., a partial LTE frame). The processing circuitry 910 may be configured to align the second signal capture to determine a location of a start of a second symbol in the second signal capture, and decode data within the second signal capture to generate a second capture grid based on the location of the start of the second symbol in the second signal capture.

Further, the processing circuitry 910 may be further configured to combine the first capture grid with the second capture grid to generate a resultant grid. In this regard, the resultant grid may indicate positions of reference symbols that are commonly located within both the first capture grid and the second capture grid. The processing circuitry 910 may also be configured to determine a subset of possible physical cell identifiers based on a position of a selected reference symbol within the resultant grid, and perform a search of the subset of possible physical cell identifiers to identify a current cell identifier corresponding to the LTE base station for the mobile communications device 900.

Some of the operations indicated herein, such as those described with respect to the flowchart of FIG. 7, may be implemented by various means, such as hardware, firmware, processor, circuitry and/or other device associated with execution of software including one or more computer program instructions. For example, one or more of the procedures described above may be embodied by computer program instructions. In this regard, the computer program instructions which embody the procedures described above may be stored by a memory device executed by a processor of processing circuitry. As will be appreciated, any such computer program instructions may be loaded onto a computer or other programmable apparatus (e.g., hardware) to produce a machine, such that the instructions which execute on the computer or other programmable apparatus create means for implementing the functions specified in the flowchart block(s). These computer program instructions may also be stored in a computer-readable memory that may direct a computer or other programmable apparatus to function in a particular manner, such that the instructions stored in the computer-readable memory produce an article of manufacture which implements the functions specified in the flowchart block(s). The computer program instructions may also be loaded onto a computer or other programmable apparatus to cause a series of operations to be performed on the computer or other programmable apparatus to produce a computer-implemented process such that the instructions which execute on the computer or other programmable apparatus implement the functions specified in the flowchart block(s).

Accordingly, blocks of the flowchart support combinations of means for performing the specified functions and combinations of operations for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

The embodiments present herein are provided as examples and therefore the associated inventions are not to be limited to the specific embodiments disclosed. For example, while portions of the description provided herein are directed to operation in an LTE environment, it is contemplated that the example embodiments provided herein may be applied in other cellular environments. Modifications and other embodiments are intended to be included within the scope of the appended claims. Moreover, although the foregoing descriptions and the associated drawings describe example embodiments in the context of certain example combinations of elements and/or functions, different combinations of elements and/or functions may be used to form alternative embodiments. In this regard, for example, different combinations of elements and/or functions other than those explicitly described above are also contemplated. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments.

What is claimed is:

1. A method comprising:
receiving a first signal capture from a first wireless, cellular communication signal transmitted by a base station, the first signal capture being a portion of a first radio frame;
aligning the first signal capture with a frame structure to determine a location of a start of a first symbol in the first signal capture;
decoding data within the first signal capture to generate a first capture grid based on the location of the start of the first symbol in the first signal capture;
receiving a second signal capture from a second wireless, cellular communication signal transmitted by the base station, the second signal capture being one or more radio frame durations after the first signal capture, the second signal capture being a portion of a second radio frame;
aligning the second signal capture with the frame structure to determine a location of a start of a second symbol in the second signal capture;
decoding data within the second signal capture to generate a second capture grid based on the location of the start of the second symbol in the second signal capture;
combining the first capture grid with the second capture grid to generate a resultant grid, the resultant grid indicating positions of reference symbols that are commonly located within both the first capture grid and the second capture grid;
determining a subset of possible physical cell identifiers based on a position of a selected reference symbol within the resultant grid; and
performing a search of the subset of possible physical cell identifiers to identify a current cell identifier corresponding to the base station for a mobile communications device.

2. The method of claim 1, wherein the first signal capture and the second signal capture do not include a primary synchronization signal or a secondary synchronization signal.

3. The method of claim 1, wherein aligning the first signal capture includes performing a time and frequency alignment based on one or more cyclic prefixes in the first signal capture.

4. The method of claim 1, wherein combining the first capture grid with the second capture grid to generate the resultant grid comprises performing a complex conjugate multiplication of the first capture grid with the second capture grid.

5. The method of claim 1, wherein combining the first capture grid with the second capture grid to generate the resultant grid comprises:
performing a complex conjugate multiplication of the first capture grid with the second capture grid to generate a product grid; and
performing a sum across frequencies of the product grid to generate the resultant grid.

6. The method of claim 1, wherein determining the subset of possible physical cell identifiers includes determining the position of the selected reference symbol within the resultant grid by determining that an energy value at the position of the selected reference symbol within the resultant grid is greater than a threshold energy.

7. The method of claim 1, wherein performing the search of the subset of possible physical cell identifiers further comprises performing the search to determine a subframe number and symbol number corresponding to the base station for the mobile communications device.

8. A mobile communications device comprising:
one or more antennas; and
processing circuitry operably coupled to the one or more antennas to support wireless, cellular communications with a base station, the processing circuitry being configured to:
receive, via the one or more antennas, a first signal capture from a first wireless, cellular communication signal transmitted by the base station, the first signal capture being a portion of a first radio frame;
align the first signal capture with a frame structure to determine a location of a start of a first symbol in the first signal capture;
decode data within the first signal capture to generate a first capture grid based on the location of the start of the first symbol in the first signal capture;
receive, via the one or more antennas, a second signal capture from a second wireless, cellular communication signal transmitted by the base station, the second signal capture being one or more frame durations after the first signal capture, the second signal capture being a portion of a second radio frame;
align the second signal capture with the frame structure to determine a location of a start of a second symbol in the second signal capture;
decode data within the second signal capture to generate a second capture grid based on the location of the start of the second symbol in the second signal capture;
combine the first capture grid with the second capture grid to generate a resultant grid, the resultant grid indicating positions of reference symbols that are commonly located within both the first capture grid and the second capture grid;
determine a subset of possible physical cell identifiers based on a position of a selected reference symbol within the resultant grid; and
perform a search of the subset of possible physical cell identifiers to identify a current cell identifier corresponding to the base station for the mobile communications device.

9. The mobile communications device of claim 8, wherein the first signal capture and the second signal capture do not include a primary synchronization signal or a secondary synchronization signal.

10. The mobile communications device of claim 8, wherein the processing circuitry configured to align the first signal capture includes being configured to perform a time and frequency alignment based on one or more cyclic prefixes in the first signal capture.

11. The mobile communications device of claim 8, wherein the processing circuitry configured to combine the first capture grid with the second capture grid to generate the resultant grid includes being configured to perform a complex conjugate multiplication of the first capture grid with the second capture grid.

12. The mobile communications device of claim 8, wherein the processing circuitry configured to combine the first capture grid with the second capture grid to generate the resultant grid includes being configured to:
perform a complex conjugate multiplication of the first capture grid with the second capture grid to generate a product grid; and perform a sum across frequencies of the product grid to generate the resultant grid.

13. The mobile communications device of claim 8, wherein the processing circuitry configured to determine the subset of possible physical cell identifiers includes being configured to determine the position of the selected reference symbol within the resultant grid by determining that an energy value at the position of the selected reference symbol in the resultant grid is greater than a threshold energy.

14. The mobile communications device of claim 8, wherein the processing circuitry configured to perform the search of the subset of possible physical cell identifiers further comprises being configured to performing the search to determine a subframe number and symbol number corresponding to the base station for the mobile communications device.

15. A cellular communications system comprising:
a base station comprising at least one base station antenna, the base station configured to transmit wireless, cellular communications signals comprising a sequence of radio frames via the at least one base station antenna; and
a mobile communications device comprising:
one or more antennas; and
processing circuitry operably coupled to the one or more antennas to support wireless, cellular communications with the base station, the processing circuitry being configured to:
receive, via the one or more antennas, a first signal capture from a first wireless, cellular communication signal transmitted by the base station, the first signal capture being a portion of a first frame;
align the first signal capture with a frame structure to determine a location of a start of a first symbol in the first signal capture;
decode data within the first signal capture to generate a first capture grid based on the location of the start of the first symbol in the first signal capture;
receive, via the one or more antennas, a second signal capture from a second wireless, cellular communication signal transmitted by the base station, the second signal capture being one or more radio frame durations after the first signal capture, the second signal capture being a portion of a second frame;
align the second signal capture with the frame structure to determine a location of a start of a second symbol in the second signal capture;
decode data within the second signal capture to generate a second capture grid based on the location of the start of the second symbol in the second signal capture;
combine the first capture grid with the second capture grid to generate a resultant grid, the resultant grid indicating positions of reference symbols that are commonly located within both the first capture grid and the second capture grid;
determine a subset of possible physical cell identifiers based on a position of a selected reference symbol within the resultant grid; and
perform a search of the subset of possible physical cell identifiers to identify a current cell identifier corresponding to the base station for the mobile communications device.

16. The cellular communications system of claim 15, wherein the first signal capture and the second signal capture do not include a primary synchronization signal or a secondary synchronization signal.

17. The cellular communications system of claim 15, wherein the processing circuitry of the mobile communications device configured to align the first signal capture includes being configured to perform a time and frequency alignment based on one or more cyclic prefixes in the first signal capture.

18. The cellular communications system of claim 15, wherein the processing circuitry of the mobile communications device configured to combine the first capture grid with the second capture grid to generate the resultant grid includes being configured to perform a complex conjugate multiplication of the first capture grid with the second capture grid.

19. The cellular communications system of claim 15, wherein the processing circuitry of the mobile communications device configured to combine the first capture grid with the second capture grid to generate the resultant grid includes being configured to:
perform a complex conjugate multiplication of the first capture grid with the second capture grid to generate a product grid; and
perform a sum across frequencies of the product grid to generate the resultant grid.

20. The cellular communications system of claim 15, wherein the processing circuitry of the mobile communications device configured to determine the subset of possible physical cell identifiers includes being configured to determine the position of the selected reference symbol within the resultant grid by determining that an energy value at the position of the selected reference symbol in the resultant grid is greater than a threshold energy.

* * * * *